United States Patent
Ma

(10) Patent No.: US 10,622,914 B2
(45) Date of Patent: Apr. 14, 2020

(54) MULTI-STAGE DC-AC INVERTER

(71) Applicant: Murata Manufacturing Co., Ltd., Nagaokakyo-shi, Kyoto-fu (JP)

(72) Inventor: Yue Ma, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/401,510

(22) Filed: May 2, 2019

(65) Prior Publication Data
US 2019/0260306 A1 Aug. 22, 2019

Related U.S. Application Data

(63) Continuation of application No. PCT/JP2017/045089, filed on Dec. 15, 2017.

(30) Foreign Application Priority Data

Jan. 11, 2017 (JP) ................. 2017-002566

(51) Int. Cl.
| | | |
|---|---|---|
| *H02M 7/483* | (2007.01) | |
| *H02M 3/158* | (2006.01) | |
| *H02M 3/156* | (2006.01) | |
| *H02M 1/00* | (2006.01) | |

(52) U.S. Cl.
CPC .......... *H02M 7/483* (2013.01); *H02M 3/156* (2013.01); *H02M 3/158* (2013.01); *H02M 2001/0003* (2013.01); *H02M 2001/007* (2013.01); *H02M 2007/4835* (2013.01)

(58) Field of Classification Search
CPC ......... H02M 2007/4835; H02M 7/483; H02M 3/158; H02M 2001/007; H02M 2001/0003
See application file for complete search history.

(56) References Cited

U.S. PATENT DOCUMENTS

| | | | |
|---|---|---|---|
| 8,885,374 B2 * | 11/2014 | Zhang | H02M 7/483 363/131 |
| 2014/0266135 A1 | 9/2014 | Zhak et al. | |
| 2014/0369090 A1 | 12/2014 | Ueki et al. | |
| 2015/0311822 A1 | 10/2015 | Ma et al. | |

(Continued)

FOREIGN PATENT DOCUMENTS

| | | |
|---|---|---|
| JP | 2008-092651 A | 4/2008 |
| JP | 2015-186281 A | 10/2015 |

(Continued)

OTHER PUBLICATIONS

Official Communication issued in International Patent Application No. PCT/JP2017/045089, dated Jan. 16, 2018.

*Primary Examiner* — Alex Torres-Rivera
(74) *Attorney, Agent, or Firm* — Keating & Bennett, LLP

(57) ABSTRACT

A Vfc balance controller includes a coefficient multiplying circuit that calculates a value of one half of a voltage, a subtractor, an adder, and a corrector. The adder adds a correction term $V\alpha \cdot \sin$ to the output from the coefficient multiplying circuit. The subtractor calculates the difference between voltage Vfc1 of a flying capacitor and the output from the adder. The corrector outputs a correction time of a pulse width so that the output from the subtractor converges to zero. The voltage of the flying capacitor is varied in this manner to reduce ripples on a DC line.

18 Claims, 10 Drawing Sheets

(56) References Cited

U.S. PATENT DOCUMENTS

2015/0357937 A1* 12/2015 Takahara .............. H02M 7/217
363/97
2017/0294853 A1* 10/2017 Flannery ............... H02M 7/483

FOREIGN PATENT DOCUMENTS

| JP | 2016-046962 A | 4/2016 | | |
|---|---|---|---|---|
| WO | WO-2011093269 A1 * | 8/2011 | .............. | H02M 7/49 |
| WO | 2013/146340 A1 | 10/2013 | | |
| WO | 2014/061519 A1 | 4/2014 | | |
| WO | 2015/030152 A1 | 3/2015 | | |

* cited by examiner

TP2: REPETITION OF MODE III → MODE II → MODE III → MODE IV

TP1: REPETITION OF MODE I → MODE II → MODE I → MODE IV

DOUBLE RIPPLE COMPONENT APPEARING ON OUTPUT LINE OF CHOPPER

OUTPUT WAVEFORM OF INVERTER

MULTI-STAGE DC-AC INVERTER

CROSS REFERENCE TO RELATED APPLICATIONS

This application claims the benefit of priority to Japanese Patent Application No. 2017-002566 filed on Jan. 11, 2017 and is a Continuation Application of PCT Application No. PCT/JP2017/045089 filed on Dec. 15, 2017. The entire contents of each of these applications are hereby incorporated herein by reference.

BACKGROUND OF THE INVENTION

1. Field of the Invention

The present invention relates to a power converter. More specifically, the present invention relates to a power converter including a flying capacitor.

2. Description of the Related Art

International Publication No. 2014/061519 discloses an inverter apparatus using a flying capacitor method. Such a multi-level inverter apparatus is composed of a series circuit including four semiconductor switching elements: two high-side semiconductor switching elements and two low-side semiconductor switching elements. Connecting a midpoint between the two high-side semiconductor switching elements to a midpoint between the two low-side semiconductor switching elements with a flying capacitor enables the breakdown voltage required for the semiconductor switching elements to be halved, thus outputting the voltage that is half of the input voltage. Accordingly, when an output waveform is made gentle with an inductor to generate sine waves, it is possible to generate the smooth sine waves with the multi-level inverter apparatus described above, compared with normal inverter apparatuses that output rectangular waves.

The inverter circuit including the flying capacitor, such as the one disclosed in International Publication No. 2014/061519, is mainly aimed to achieve benefits of a reduction in cost because of the breakdown voltage of the switching elements, which are half of the input voltage, and a reduction in loss and improved conversion efficiency because of the decreased on-resistance of the switching elements. Accordingly, a variation in the voltage between both ends of the flying capacitor is suppressed by correcting the duty of the switching elements so that the voltage between terminals of the flying capacitor is half of the input voltage while monitoring the voltage between the terminals of the flying capacitor.

In the case of a single-phase inverter that converts direct-current voltage into alternating-current voltage, ripple components of a frequency (100 Hz or 120 Hz) that is twice the frequency (50 Hz or 60 Hz when the output is interconnected to the system) of the output alternating-current voltage appear in a direct-current voltage line at the input side. In order to accommodate this, an aluminum electrolytic capacitor has been used as a high-capacitance smoothing capacitor at the input side.

Long life and a reduction in size are further required in, for example, power converters for photovoltaic power generation in recent years.

SUMMARY OF THE INVENTION

Preferred embodiments of the present invention provide power converters that are each reduced in size.

A power converter according to a preferred embodiment of the present invention includes a first voltage converter, a second voltage converter, a capacitor, and a controller. The first voltage converter converts a first direct-current voltage into a second direct-current voltage. The second voltage converter is connected to the first voltage converter and converts the second direct-current voltage into alternating-current voltage. The capacitor is provided between the first voltage converter and the second voltage converter, and receives the second direct-current voltage between its terminals. The controller controls the first voltage converter and the second voltage converter. When n denotes an integer not smaller than two and m denotes an integer that is not smaller than one and that is not greater than n−1, at least one of the first voltage converter and the second voltage converter includes a first switch circuit in which an n-number of first semiconductor switching elements are connected in series to each other, a second switch circuit in which an n-number of second semiconductor switching elements are connected in series to each other, and an n−1-number of flying capacitors. The first switch circuit and the second switch circuit are connected at a connection node. Among the n−1 flying capacitors, an m-th flying capacitor is connected between a first intermediate node and a second intermediate node. The first intermediate node is a node that connects an m-th first semiconductor switching element to an m+1-th first semiconductor switching element at the first switch circuit side viewed from the connection node. The second intermediate node connects an m-th second semiconductor switching element to an m+1-th second semiconductor switching element at the second switch circuit side viewed from the connection node. The controller controls the first switch circuit and the second switch circuit so that a target value of a voltage between both ends of the flying capacitor is maximized at a phase angle of about $\pi/4$ and is minimized at a phase angle of about $3\pi/4$ based on the alternating-current voltage, which is A sin ωt (A denotes amplitude, ω denotes angular frequency, and t denotes time and a phase angle is 0° when t=0).

With the power converters according to preferred embodiments of the present invention, the flying capacitor partially plays the role of a capacitor to accommodate ripples to decrease the capacitance value of a smoothing capacitor. Accordingly, the power converters are each capable of being reduced in size or an aluminum electrolytic capacitor is capable of being replaced with a film capacitor to increase the lifetime of the power converter.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
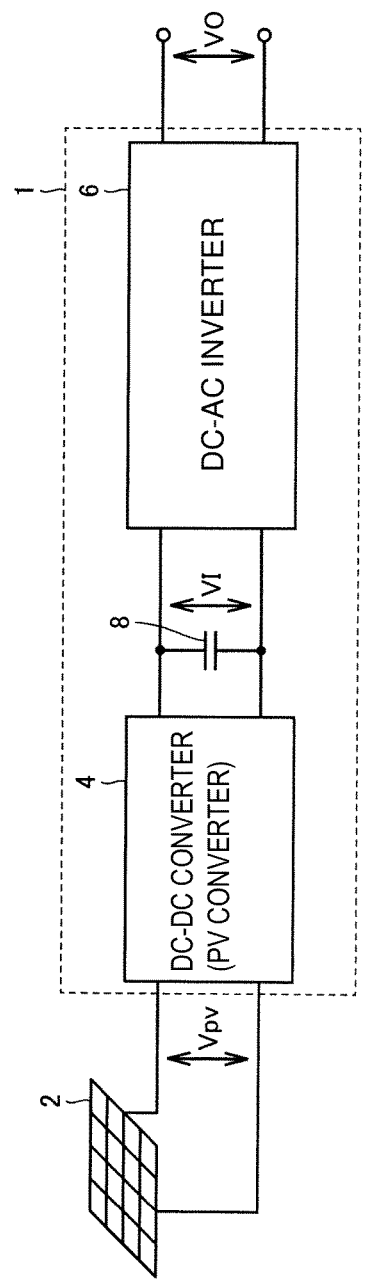
FIG. 1 illustrates an example of the configuration of a system using a power converter of a preferred embodiment of the present invention.

Preferred embodiments of the present invention will herein be described in detail with reference to the drawings. The same reference numerals are used in the drawings to identify the same components or the corresponding components and a description of such components is not duplicated.

FIG. 1 illustrates an example of the configuration of a system using a power converter of a preferred embodiment of the present invention. Referring to FIG. 1, a system 1 includes a solar panel 2, a direct current-direct current (DC-DC) converter (photovoltaic (PV) converter) 4, a smoothing capacitor 8, and a direct current-alternating current (DC-AC) inverter 6.

The DC-DC converter 4 is disposed at an upstream side of the system 1 and the DC-AC inverter 6 is disposed at a downstream side thereof. The smoothing capacitor 8 to remove ripples is connected between the DC-DC converter 4 and the DC-AC inverter 6.

Maximum power point tracking (MPPT) control from the solar panel 2 is performed by the DC-DC converter 4 to extract maximum power of the solar panel. The voltage input from the solar panel 2 is preferably about 20 V to about 50 V, for example, when one panel is used. However, there are cases in which multiple panels that are connected in series to each other are used and, in these cases, the voltage input from the solar panel 2 is varied in a range from about 100 V to about 200 V depending on the sunshine condition or the like. Since the voltage output from the DC-AC inverter 6 is about AC 200 Vrms (effective value), peak-to-peak voltage is about 282 Vp-p, which is about √2 of the voltage output from the DC-AC inverter 6. Accordingly, direct current of about 282 V is required as an input into the DC-AC inverter 6. Since it is necessary to have a margin, for example, because of the conversion efficiency that is not 100%, the DC-AC inverter 6 preferably increases DC voltage Vpv to DC voltage of about 340 V to about 380 V, for example.

In the present preferred embodiment, at least one of the upstream DC-DC converter 4 and the downstream DC-AC inverter 6, which are voltage conversion stages, preferably includes a series circuit including an n-number of low-side switching elements and an n-number of high-side switching elements. Intermediate nodes of one, two, . . . , and an n−1 number from a connection node at the center of the high-side switching elements and the low-side switching elements are connected to each other with an n−1 number of flying capacitors.

A case in which the flying capacitors are included in the DC-AC inverter 6, which is a power conversion stage, will be described as a first preferred embodiment of the present invention and a case in which the flying capacitor is included in the DC-DC converter 4, which is the power conversion stage, will be described as a second preferred embodiment of the present invention.

First Preferred Embodiment

Figure 2:
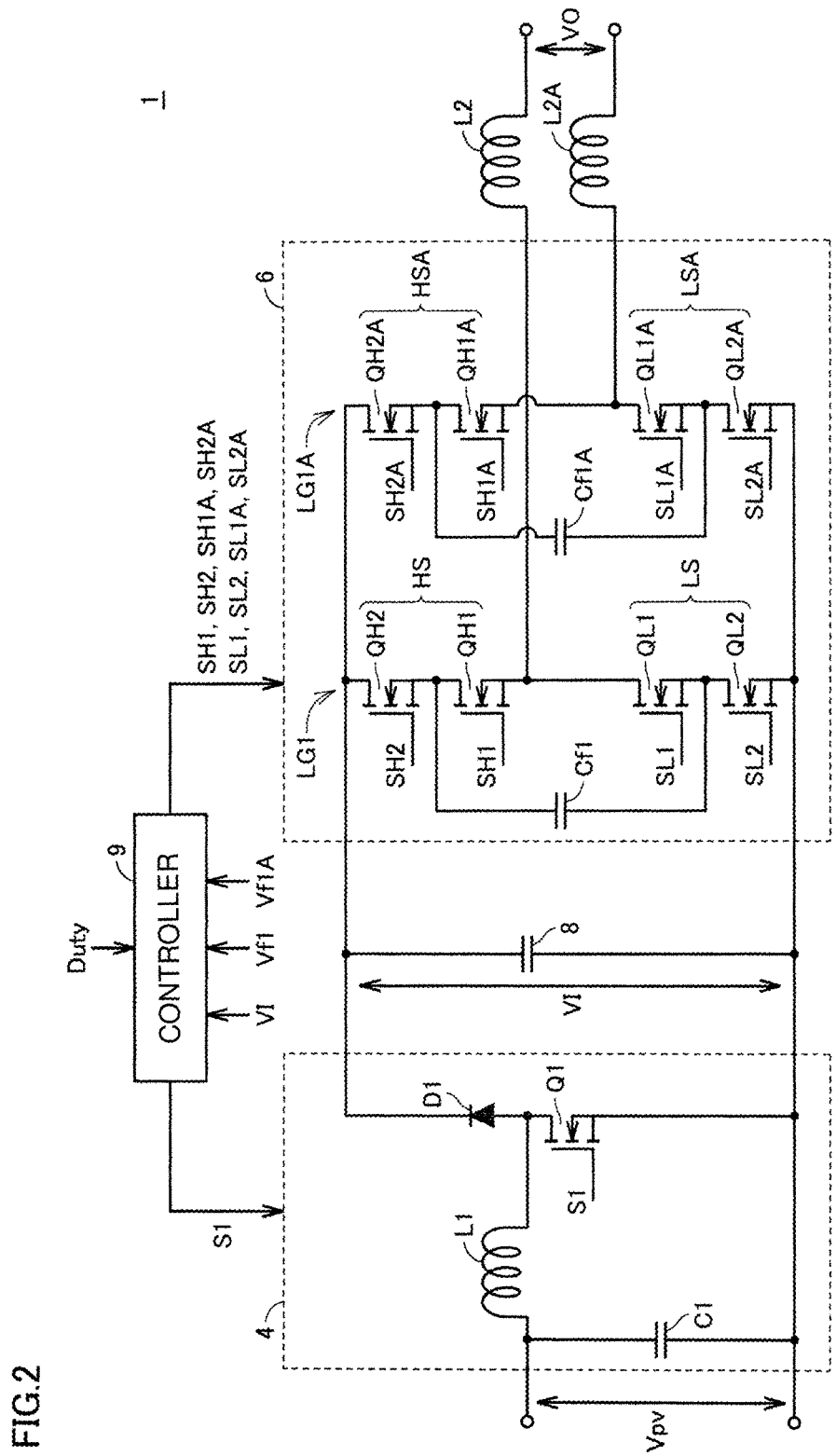
FIG. 2 is a circuit diagram illustrating the configuration of a power converter of a first preferred embodiment of the present invention.

FIG. 2 is a circuit diagram illustrating the configuration of a power converter of the first preferred embodiment. The DC-AC inverter 6 in FIG. 1 is described as the power converter.

The DC-DC converter 4 is a general step-up chopper circuit and the downstream DC-AC inverter 6 is a multi-level inverter including flying capacitors.

The DC-DC converter 4 receives the direct-current voltage Vpv supplied from the solar panel 2 and outputs step-up voltage VI. The DC-AC inverter 6 converts the direct-current voltage VI into alternating-current voltage VO.

The DC-DC converter 4 includes a coil L1, a filter capacitor C1, a transistor Q1, and a diode D1. A transistor that is controlled complementarily with the transistor Q1 may preferably be provided, instead of the diode D1. A semiconductor switching element, such as a metal oxide semiconductor field effect transistor (MOSFET) or an insulated gate bipolar transistor (IGBT), for example, may preferably be used as the transistor.

The smoothing capacitor 8 is connected between a pair of power lines through which the voltage VI is supplied from the DC-DC converter 4 to the DC-AC inverter 6.

The DC-AC inverter 6 includes a leg LG1 and a leg LG1A that receive the voltage VO at both ends and flying capacitors Cf1 and Cf1A.

The leg LG1 includes a high-side switch HS including a series circuit that includes two first semiconductor switching elements QH1 and QH2 and a low-side switch LS including a series circuit that includes two second semiconductor switching elements QL1 and QL2. The low-side switch LS is connected in series to the high-side switch HS at a connection node to which one end of an output coil L2 is connected.

The leg LG1A includes a high-side switch HSA including a series circuit that includes two first semiconductor switching elements QH1A and QH2A and a low-side switch LSA including a series circuit that includes two second semiconductor switching elements QL1A and QL2A. The low-side switch LSA is connected in series to the high-side switch HSA at a connection node to which one end of an output coil L2A is connected.

The alternating-current voltage VO is output from the other ends of the output coils L2 and L2A.

The flying capacitor Cf1 is connected between an intermediate node with which the first semiconductor switching element QH1 and the second semiconductor switching element QH2, at the high-side switch HS side viewed from the connection node between the low-side switch LS and the high-side switch HS, are connected to each other and an intermediate node with which the first semiconductor switching element QL1 and the second semiconductor switching element QL2, at the low-side switch LS side viewed from the connection node between the low-side switch LS and the high-side switch HS, are connected to each other.

The flying capacitor Cf1A is connected between an intermediate node with which the first semiconductor switching element QH1A and the second semiconductor switching element QH2A, at the high-side switch HSA side viewed from the connection node between the low-side switch LSA and the high-side switch HSA, are connected to each other and an intermediate node with which the first semiconductor switching element QL1A and the second semiconductor switching element QL2A, at the low-side switch LSA side viewed from the connection node between the low-side switch LSA and the high-side switch HSA, are connected to each other.

In the configuration including the flying capacitors described above, a controller 9 performs control in the following manner in order to reduce ripples occurring in the voltage VI.

The controller 9 preferably controls the high-side switch HS and the low-side switch LS so that a target value of the voltage between both ends of the flying capacitor Cf1 is, for example, maximized at a phase angle of about π/4 and is minimized at a phase angle of about 3π/4 based on at least one of the voltage value, the phase, and the frequency of the alternating-current voltage VO. Here, the alternating-current voltage VO is A sin ωt (A denotes amplitude, ω denotes angular frequency, and t denotes time and the phase angle is 0° when t=0).

Similarly, the controller 9 preferably controls the high-side switch HSA and the low-side switch LSA so that a target value of the voltage between both ends of the flying capacitor Cf1A is, for example, maximized at a phase angle of about π/4 and is minimized at a phase angle of about 3π/4 based on at least one of the voltage value, the phase, and the frequency of the alternating-current voltage VO. Here, the alternating-current voltage VO is A sin ωt (A denotes amplitude, w denotes angular frequency, and t denotes time and the phase angle is 0° when t=0).

Before how the controller 9 performs the control is described in detail, a basic operation of the power converter including the flying capacitors will now be described.

Figure 3:
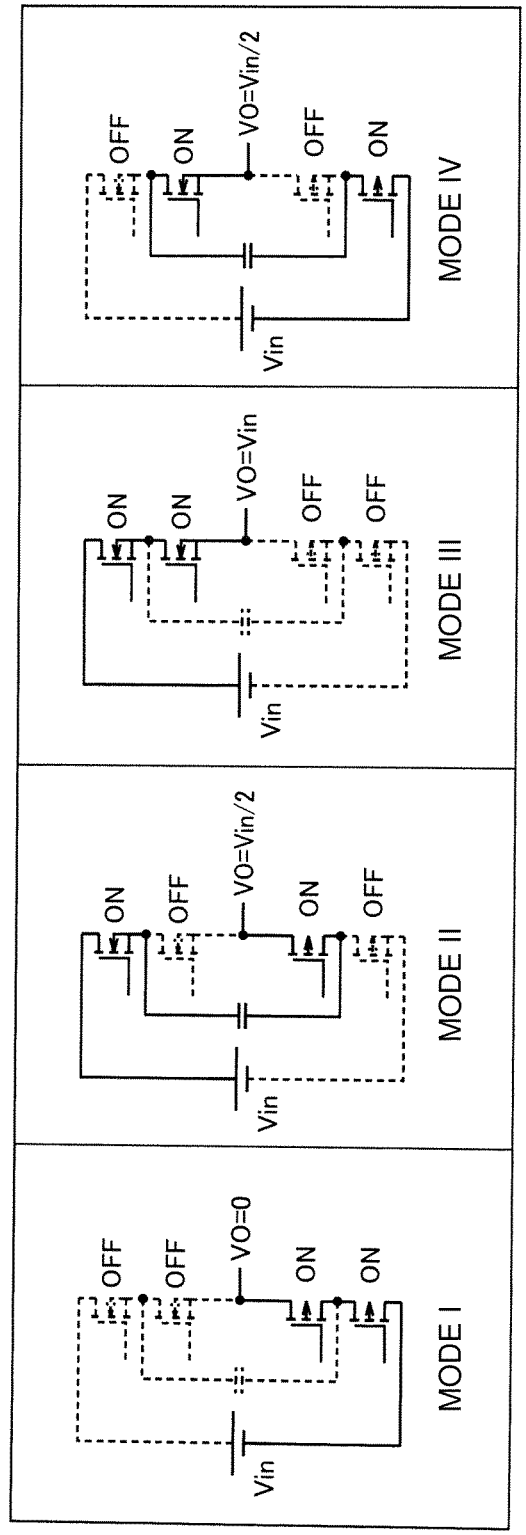
FIG. 3 is a diagram for describing operation modes of a voltage conversion stage including flying capacitors in the first preferred embodiment of the present invention.
Figure 4:
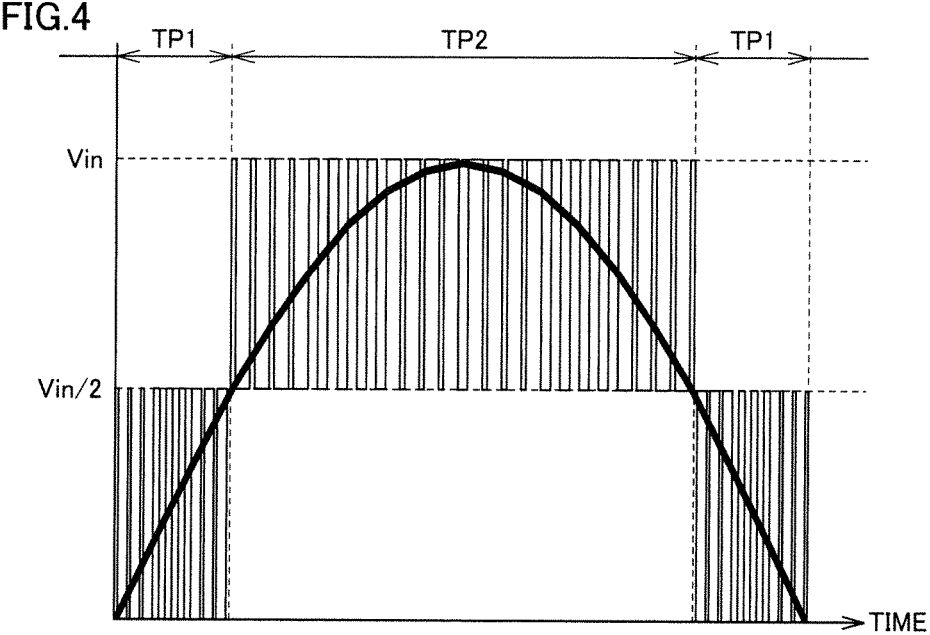
FIG. 4 is a diagram for describing how the operation mode is switched in generation of sine waves.

FIG. 3 is a diagram for describing operation modes of the power conversion stage including the flying capacitors in the first preferred embodiment. FIG. 4 is a diagram for describing how the operation mode is switched in generation of sine waves.

As illustrated in FIG. 3, the power conversion stage may include four states: mode I to mode IV. The operation modes of the power conversion stage will be described in association with the leg LG1 in FIG. 2.

In the mode I, the semiconductor switching elements QH1 and QH2 are in an OFF state and the semiconductor switching elements QL1 and QL2 are in an ON state. 0 V is output from a center node of the power conversion stage in the mode I.

In the mode II, the semiconductor switching elements QH1 and QH2 are in the OFF state and the ON state, respectively, and the semiconductor switching elements QL1 and QL2 are in the ON state and the OFF state, respectively. When the voltage between both ends of the flying capacitor is denoted by Vfc, Vin−Vfc is output from the center node of the power conversion stage in the mode II. When Vfc=Vin/2, Vin/2 is output from the center node of the power conversion stage.

In the mode III, the semiconductor switching elements QH1 and QH2 are in the ON state and the semiconductor switching elements QL1 and QL2 are in the OFF state. Vin is output from the center node of the power conversion stage in the mode III.

In the mode IV, the semiconductor switching elements QH1 and QH2 are in the ON state and the OFF state, respectively, and the semiconductor switching elements QL1 and QL2 are in the OFF state and the ON state, respectively. Vfc is output from the center node of the power conversion stage in the mode IV. When Vfc=Vin/2, Vin/2 is output from the center node of the power conversion stage.

As illustrated in FIG. 4, in an area in which the voltage is relatively low with respect to the waveform of the output alternating-current voltage (during a period TP1 in which VO is varied in a range from 0 to Vin/2), the power conversion stage repeatedly operates in the order of "MODE I→MODE II→MODE I→MODE IV" to generate a sine-wave waveform. In an area in which the voltage is relatively high (a period TP2 in which VO is varied in a range from Vin/2 to Vin), the power conversion stage repeatedly operates in the order of "MODE III→MODE II→MODE III→MODE IV" to generate a sine-wave waveform.

Here, although controlling the duty of the transistor varies the voltage Vfc between both ends of the flying capacitor, the waveform of the output voltage may be distorted concurrently. Accordingly, no idea is provided to positively vary the duty in the related art. It is assumed in the related art that the voltage Vfc between both ends of the flying capacitor is controlled using one half of Vin as the target value.

However, in order to reduce or prevent the capacitance of the smoothing capacitor to a low value to reduce the size of the power converter, the target value of the voltage Vfc is positively varied to cause the flying capacitor to accommodate for the ripples appearing in the voltage VI in the present preferred embodiment.

Figure 5:
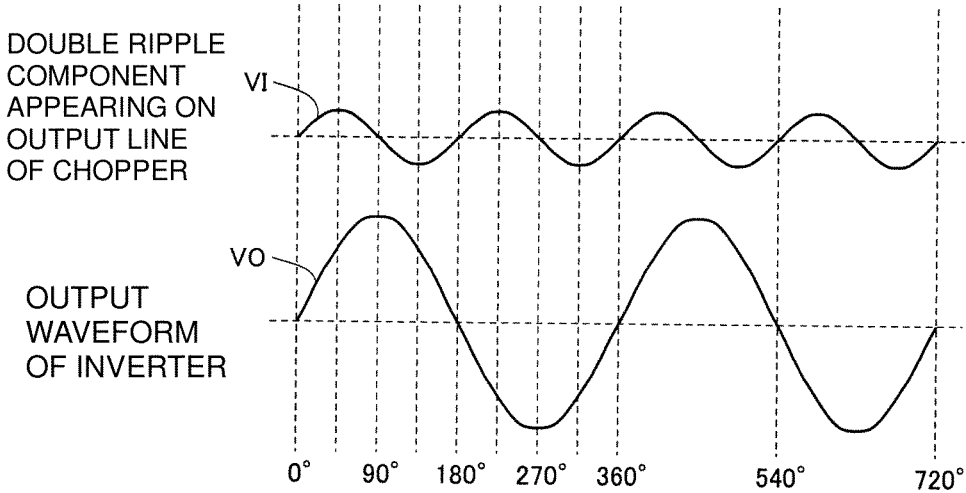
FIG. 5 is a graph illustrating the relationship between an output waveform from an inverter and a ripple waveform appearing on an output line of a chopper.

What ripple voltage appears in the power converter will now be described. FIG. 5 is a graph illustrating the relationship between the output waveform from the inverter and the ripple waveform appearing on the output line of the chopper.

As illustrated in FIG. 5, the frequency of the ripple components of the voltage VI is about twice the frequency of the output voltage VO from the inverter.

When the reduction of the ripples is not considered, the voltage of the flying capacitor is controlled so that the difference between ½ of the input direct-current voltage VI and the voltage Vfc of the flying capacitor is equal or approximately equal to zero.

In the voltage control in the above manner, output power is zero at zero cross points (at which the phase is about 0°, about 180°, and about 360°) of the output sine waves when the resistance of a load to which the alternating-current power is supplied is constant. The output power is maximized at upper and lower peak points (at which the phase is about 90° and about 270°) of the output sine waves.

Specifically, the smoothing capacitor is in a discharge state during a period from a phase of about 45° to a phase of about 135°, the smoothing capacitor is in a charge state during a period from a phase of about 135° to a phase of about 225°, and the smoothing capacitor is in the discharge again during a period from a phase of about 225° to a phase of about 315° with respect to the output power when the phase is about 45°, about 135°, about 225°, and about 315°. Accordingly, the voltage VI has a maximum value when the phase is about 45° and about 225° and has a minimum value when the phase is about 135° and about 315°.

In the present preferred embodiment, focusing on the above relationship, correction to reduce the ripple voltage is added to the control in which the voltage Vfc of the flying capacitor is made VI/2. In this correction, the voltage Vfc is controlled so as to cancel the ripple voltage in accordance with the variation of the ripple voltage, which is about twice the variation of the output sine waves.

Figure 6:
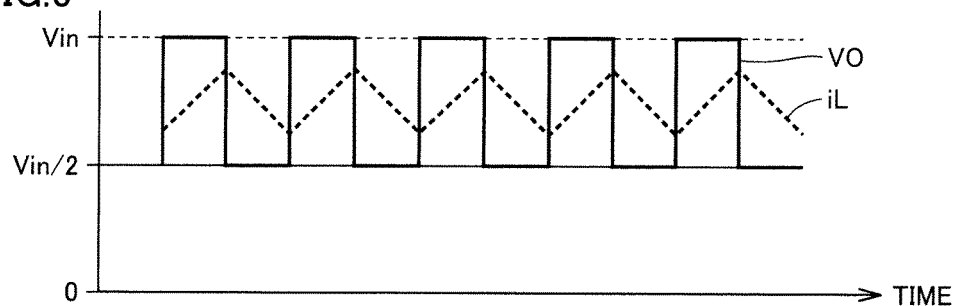
FIG. 6 illustrates the current flowing through the voltage conversion stage when the voltage of the flying capacitor is fixed.
Figure 7:
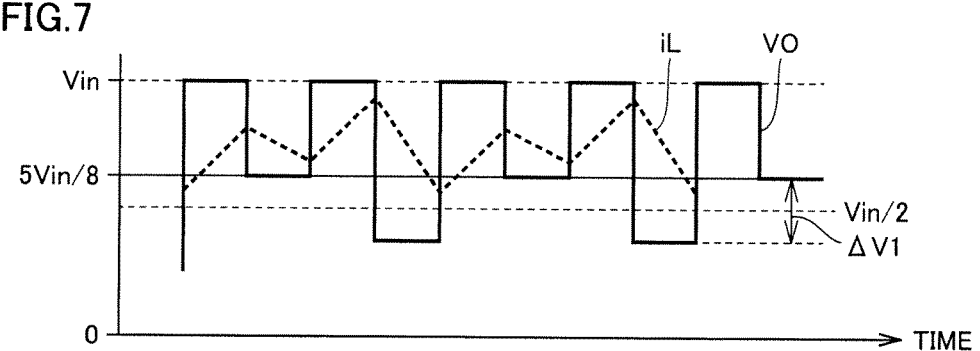
FIG. 7 illustrates the current flowing through the voltage conversion stage when the voltage of the flying capacitor is periodically varied.
Figure 8:
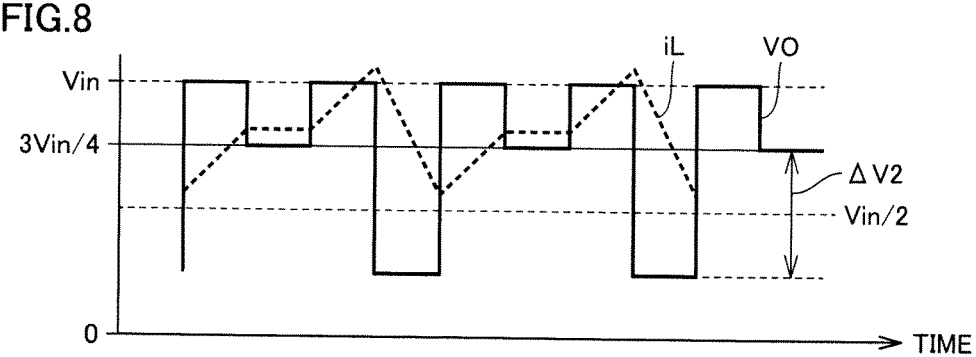
FIG. 8 illustrates the current flowing through the voltage conversion stage when the voltage of the flying capacitor is greatly periodically varied, compared with that in FIG. 7.

FIG. 6 illustrates the current flowing through the voltage conversion stage when the voltage of the flying capacitor is fixed. FIG. 7 illustrates the current flowing through the voltage conversion stage when the voltage of the flying capacitor is periodically varied. FIG. 8 illustrates the current flowing through the voltage conversion stage when the voltage of the flying capacitor is greatly periodically varied, compared with that in FIG. 7.

In FIG. 6, the voltage of the flying capacitor is fixed to Vin/2 and current iL flowing through L components at the output side fluctuates with a switching period and is in a steady state. In contrast, the voltage Vfc of the flying capacitor is varied at an amplitude of $\Delta V1$ with respect to Vin/2 in FIG. 7, and the voltage Vfc of the flying capacitor is varied at an amplitude of $\Delta V2$ with respect to Vin/2 in FIG. 8.

Since the ripple components shared by the flying capacitor are increased with the increasing variation width, the capacitance of the smoothing capacitor 8 is capable of being reduced or prevented. In contrast, since it is necessary to increase the breakdown voltage of the flying capacitor by an amount corresponding to the increased variation width when the variation width is large, further consideration is required.

The smoothing capacitor 8 is provided to accommodate for the ripple voltage of about 100 Hz or about 120 Hz, which is about twice the frequency of the commercial power. Since the flying capacitors Cf1 and Cf1A are required to accommodate for the variation in the switching frequency of the inverter, it is preferable to use capacitors having excellent characteristics in high frequencies for the flying capacitors. Since film capacitors have excellent frequency characteristics in high frequencies, compared with those of aluminum electrolytic capacitors, the film capacitors are preferably used for the flying capacitors.

In general, the aluminum electrolytic capacitors have high capacitances and low breakdown voltages while the film capacitors have capacitances lower than those of the aluminum electrolytic capacitors but have breakdown voltages higher than those of the aluminum electrolytic capacitors. Since the flying capacitors have capacitances lower than those of the smoothing capacitors, the film capacitors are able to being used for the flying capacitors.

Examples of the voltage to be applied to the smoothing capacitor and the voltage to be applied to the flying capacitors will now be described with reference to FIG. 1 again. The DC-DC converter 4 in FIG. 1 is preferably used as a PV converter, for example, the input of which is connected to the solar panel. The PV converter performs the maximum power point tracking (MPPT) control to extract the maximum power of the solar panel.

Since the output voltage of the DC-AC inverter 6 is about AC 200 V (effective value), $200 \times \sqrt{2}$=about 282 V is simply required as the output voltage VI from the DC-DC converter 4. However, in consideration of the modulation factor and the efficiency, the DC-AC inverter 6 performs control so that VI is preferably about 340 V, for example, with a margin ensured.

In an example, when the capacitance of the smoothing capacitor is about 500 µF and the breakdown voltage thereof is about 450 V, the capacitance of the flying capacitors is preferably about 80 µF, for example, (four flying capacitors of about 20 µF are connected in parallel to each other and the breakdown voltage is about 450 V). For example, when the input voltage VI is about DC 340 V, the voltage (working voltage) to be applied to the flying capacitors is preferably about 170 V, for example, which is half of the working voltage. Accordingly, the breakdown voltage of about 450 V of the flying capacitors is frequently sufficient for the working voltage in the configuration in which the film capacitors are used for the flying capacitors. Consequently, only changing the control method of the configuration in the related art enables the capacitance of the smoothing capacitor to be decreased.

Figure 9:
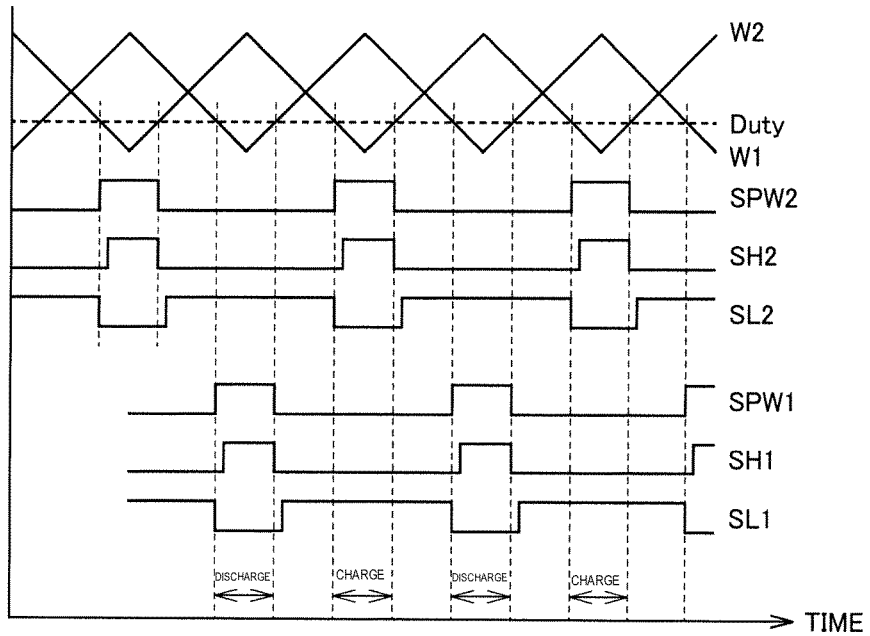
FIG. 9 is a waveform diagram illustrating a control waveform of a transistor when control in the related art is performed.
Figure 10:
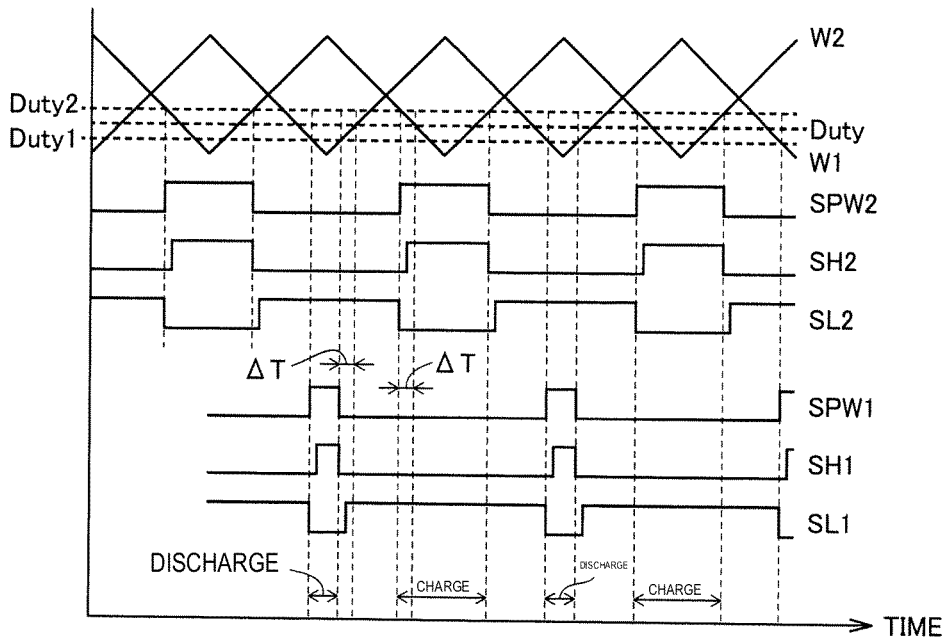
FIG. 10 is a waveform diagram illustrating the control waveform of the transistor when the voltage of the flying capacitors is controlled, as in a preferred embodiment of the present invention.

Next, a non-limiting example of a method of controlling the voltage of the flying capacitors will now be described. FIG. 9 is a waveform diagram illustrating a control waveform of the transistor when the control in the related art is performed. FIG. 10 is a waveform diagram illustrating the control waveform of the transistor when the voltage of the flying capacitors is controlled, as in the present preferred embodiment.

Referring to FIG. 9 and FIG. 10, waveforms W1 and W2 indicate waveforms corresponding to carrier signals when pulse width modulation (PWM) is performed and Duty indicates a voltage instruction value. Signals SH1 and SL1 indicate control signals to be applied to the semiconductor switching elements QH1 and QL1, respectively, and a signal SPW1 indicates a waveform on which the signals SH1 and SL1 are based. Signals SH2 and SL2 indicate control signals to be applied to the semiconductor switching elements QH2 and QL2, respectively, and a signal SPW2 indicates a waveform on which the signals SH2 and SL2 are based. In order to prevent short circuit caused by the two transistors that are simultaneously turned on, dead time correction is performed to the signals SPW1 and SPW2 to generate the signals SH1, SL1, SH2, and SL2.

As illustrated in FIG. 9, a high-level period of the signal SPW1 determines a discharge period of the flying capacitors and the high-level period of the signal SPW2 determines a charge period of the flying capacitors.

In the normal PWM control, the high-level period of the signal SPW1 and the high-level period of the signal SPW2 are determined by the level of the signal Duty, which is the voltage instruction value. However, only one voltage instruction value is normally provided. Since the charge period and the discharge period are increased in the same manner when the level of the signal Duty is increased, both charge current and discharge current of the flying capacitors are increased but the voltage of the flying capacitors is not changed. Conversely, since the charge period and the discharge period are decreased in the same manner when the level of the signal Duty is decreased, both the charge current and the discharge current of the flying capacitors are decreased but the voltage of the flying capacitors is not changed.

In the present preferred embodiment, as illustrated in FIG. 10, the control is performed so that the pulse width determining the charge period and the pulse width determining the discharge period are varied. Referring to FIG. 10, the pulse width of the signal SPW1, which determines the discharge period, is decreased from a standard value by $\Delta T$ and the pulse width of the signal SPW2, which determines the charge period, is increased from a standard value by ΔT to increase the amount of charge in the flying capacitors, thus increasing the voltage Vfc.

However, in order to perform the control in the above manner, for example, a process to apply signals Duty1 and Duty2 illustrated in FIG. 10 to the carrier signals W1 and W2, respectively, is required. However, one signal Duty indicating the voltage instruction value is used in the normal PWM control. Accordingly, the controller 9 in FIG. 2 controls the semiconductor switching elements using a pulse resulting from correction of a basic pulse generated based on the signal Duty based on at least one of the voltage value, the phase, and the frequency of the alternating-current voltage VO.

Specifically, the controller 9 determines basic conduction times of the first semiconductor switching elements QH1, QH2, QH1A, and QH2A and the second semiconductor switching elements QL1, QL2, QL1A, and QL2A based on a control signal having a basic pulse width. When the correction to reduce the conduction time of either of the semiconductor switching elements QH1 and QH2 and the semiconductor switching elements QL1 and QL2 is performed based on the variation in the alternating-current voltage VO in order to reduce the ripples, the conduction time of the remaining of the semiconductor switching elements QH1 and QH2 and the semiconductor switching elements QL1 and QL2 is increased.

Similarly, when the correction to reduce the conduction time of either of the semiconductor switching elements QHA1 and QHA2 and the semiconductor switching elements QLA1 and QLA2 is performed based on the variation in the alternating-current voltage VO in order to reduce the ripples, the conduction time of the remaining of the semiconductor switching elements QH1A and QH2A and the semiconductor switching elements QL1A and QL2A is increased.

Figure 11:
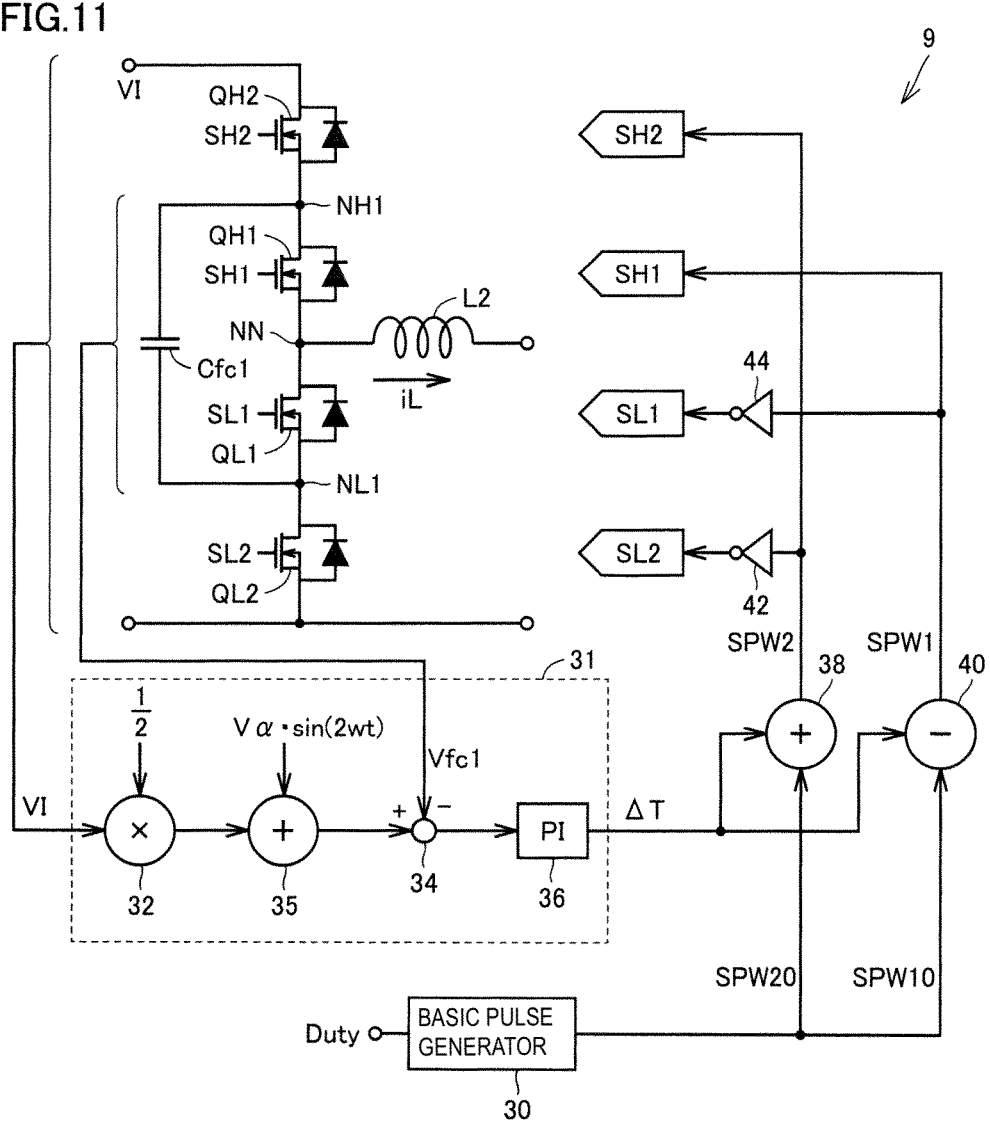
FIG. 11 is a block diagram illustrating the configuration of a controller 9.

FIG. 11 is a block diagram illustrating the configuration of the controller 9. One power conversion stage is additionally illustrated in FIG. 11 for convenience. Referring to FIG. 11, the controller 9 includes a basic pulse generator 30, a Vfc balance controller 31, an adder 38, and a subtractor 40.

The basic pulse generator 30 generates signals SPW10 and SPW20, which are the same or substantially the same as the basic pulses SPW1 and SPW2 when no control is performed, as illustrated in FIG. 9, based on the voltage instruction value Duty.

The Vfc balance controller 31 includes a coefficient multiplying circuit 32 that calculates a value of one half of the voltage VI, a subtractor 34, an adder 35, and a corrector 36. The adder 35 adds a correction term Vα·sin (2 wt) to the output from the coefficient multiplying circuit 32. The subtractor 34 calculates the difference between voltage Vfc1 of the flying capacitor and the output from the adder 35. The corrector 36 outputs a correction time ΔT of the pulse width so that the output from the subtractor 34 converges to zero.

Here, it is assumed that Vα=K·Po (K denotes designed maximum variation value of Vfc/rated power and Po denotes output power). For example, when the maximum variation width of Vfc is about 50 V at a rated power of about 1 kW, K=50/1,000=about 0.05. If the output is about 500 W, which is about one half of 1 kW, the variation width of Vfc is preferably about 25 V, for example.

When the signal ΔT output from the corrector 36 is a positive value, the charge period of the flying capacitor is lengthened and the discharge period thereof is shortened, as illustrated in FIG. 10. Accordingly, the voltage Vfc1 of the flying capacitor is increased. In contrast, when the signal ΔT output from the correction unit 36 is a negative value, the charge period of the flying capacitor is shortened and the discharge period thereof is lengthened, against the waveform in FIG. 10. Accordingly, the voltage Vfc1 of the flying capacitor is decreased. Although the configuration of the controller 9 for the flying capacitor Cf1 in the leg LG1 is typically illustrated in FIG. 11, a control block having the same or similar configuration is provided for the flying capacitor Cf1A in the leg LG1A.

The operation of the Vfc balance controller 31 will now be described using mathematical expressions.

The input voltage and the output voltage of the DC-DC converter 4 (chopper) in FIG. 2 are denoted by Vin1 (=Vpv) and Vout1 (=VI), respectively, the input voltage and the output voltage of the DC-AC inverter 6 (inverter) are denoted by Vin2 (=Vout1=VI) and Vout2 (=VO), respectively, and the voltages between both ends of the flying capacitors Cf1 and Cf1A are denoted by Vcf1 and Vcf1A, respectively. The voltages Vcf1 and Vcf1A between both ends of the flying capacitors Cf1 and Cf1A are detected with insulation being ensured using an insulation amplifier or the like.

When the control to reduce the ripples is not performed, the control is performed so that both ΔVcf1 and ΔVcf1A are equal or substantially equal to zero in the following equations (1) and (2):

$$\Delta Vcf1 = \tfrac{1}{2} \cdot Vin2 - Vcf1 \qquad (1)$$

$$\Delta Vcf1A = \tfrac{1}{2} \cdot Vin2 - Vcf1A \qquad (2)$$

In the present preferred embodiment in which the control to reduce the ripples is performed, the control is performed so that both ΔVcf1 and ΔVcf1A are equal or approximately equal to zero in the following equations (3) and (4):

$$\Delta Vcf1 = \tfrac{1}{2} \cdot Vin2 + V\alpha \cdot \sin(2\omega t) - Vcf1 \qquad (3)$$

$$\Delta Vcf1A = \tfrac{1}{2} \cdot Vin2 + V\alpha \cdot \sin(2\omega t) - Vcf1A \qquad (4)$$

In equations (3) and (4), Vα is a value within a range of $0 < V\alpha < \tfrac{1}{2} \cdot Vin2$ and is preferably varied in proportion to the input power and the output power of the effective value. In equations (3) and (4), ω=2πf and f=about 50 Hz or about 60 Hz (the frequency of commercial alternating current).

With the power converter of the first preferred embodiment described above, the variation in the direct-current voltage at the input side, which is caused by the inverter at the output side and which has been accommodated for by increasing the capacitance of the capacitor to remove ripples, is partially addressed by intentionally varying the charge voltage of the flying capacitor. Accordingly, it is possible to improve the ripple removal effect or decrease the capacitance of the flying capacitor. As a result, the power converter is capable of being reduced in size or the aluminum electrolytic capacitor is capable of being replaced with the film capacitor to increase the lifetime of the power converter.

Although the configuration illustrated in FIG. 2 preferably includes the four semiconductor switching elements connected in series to each other and one flying capacitor for one leg, a 2n-number of the semiconductor switching elements may be connected in series to each other (n is an integer not smaller than two).

Figure 12:
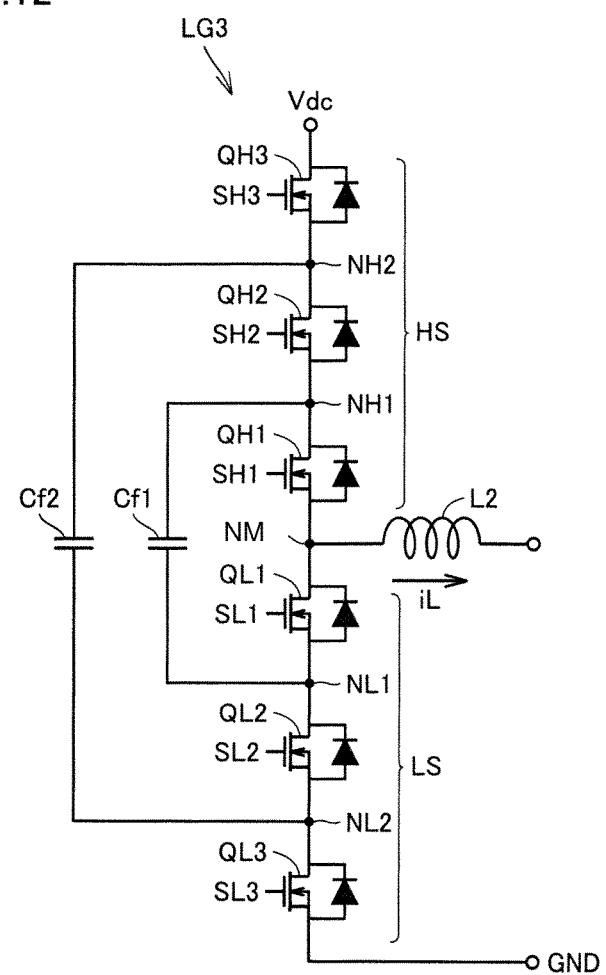
FIG. 12 illustrates the configuration of a leg when n=3.

FIG. 12 illustrates the configuration of a leg when n=3. The configuration in FIG. 12 applies to the following description when n=3.

It is assumed that n is an integer not smaller than two and m is an integer that is not smaller than one and that is not greater than n−1. A leg LG3 includes the high-side switch HS including a series circuit that includes an n-number of first semiconductor switching elements QH1 to QH3, the low-side switch LS including a series circuit that includes an n-number of second semiconductor switching elements QL1 to QL3 and that is connected in series to the high-side switch HS with a connection node, and an n−1 number of flying capacitors Cf1 and Cf2.

Among the n−1 flying capacitors, an m-th flying capacitor Cfm is connected between a first intermediate node NHm and a second intermediate node NLm. The first intermediate node NHm connects an m-th first semiconductor switching element QHm to an m+1-th first semiconductor switching element QH(m+1) at the high-side switch side viewed from a connection node NM. The second intermediate node NLm connects an m-th second semiconductor switching element QLm to an m+1-th second semiconductor switching element QL(m+1) at the low-side switch side viewed from the connection node NM.

Specifically, when n=3 and one and two are applied to m in the above description, the leg LG3 has the following configuration.

The first flying capacitor Cf1 is connected between a first intermediate node NH1 and a second intermediate node NL1. The first intermediate node NH1 connects the first first semiconductor switching element QH1 to the second first semiconductor switching element QH2 at the high-side switch side viewed from the connection node NM. The second intermediate node NL1 connects the first second semiconductor switching element QL1 to the second second semiconductor switching element QL2 at the low-side switch side viewed from the connection node NM.

The flying capacitor Cf2 is connected between a first intermediate node NH2 and a second intermediate node NL2. The first intermediate node NH2 connects the second first semiconductor switching element QH2 to the third first semiconductor switching element QH3 at the high-side switch side viewed from the connection node NM. The second intermediate node NL2 connects the second second semiconductor switching element QL2 to the third second semiconductor switching element QL3 at the low-side switch side viewed from the connection node NM.

In the above configuration, the voltage between both ends of the flying capacitor Cf1 is on average ⅓×VI and the voltage between both ends of the flying capacitor Cf2 is on average ⅔×VI.

Also when each leg has the configuration in FIG. 12, the controller 9 is capable of reducing the ripples by similarly controlling the first switch circuit and the second switch circuit so that the target value of the voltage between both ends of the flying capacitor is maximized at a phase angle of about π/4 and is minimized at a phase angle of about 3π/4 based on at least one of the voltage value, the phase, and the frequency of the alternating-current voltage. Here, the alternating-current voltage is A sin ωt (A denotes amplitude, ω denotes angular frequency, and t denotes time and the phase angle is 0° when t=0).

Second Preferred Embodiment

The case is described in the first preferred embodiment in which the flying capacitors are included in the DC-AC inverter 6 in FIG. 1, which is the power conversion stage. In contrast, a case will be described in a second preferred embodiment of the present invention in which a flying capacitor is included in the DC-DC converter 4 in FIG. 1, which is the power conversion stage. In order to discriminate the second preferred embodiment from the first preferred embodiment, the system 1 in FIG. 1 is described as a system 101 and the DC-AC inverter 6 in FIG. 1 is described as a DC-AC inverter 106 in the second preferred embodiment.

Figure 13:
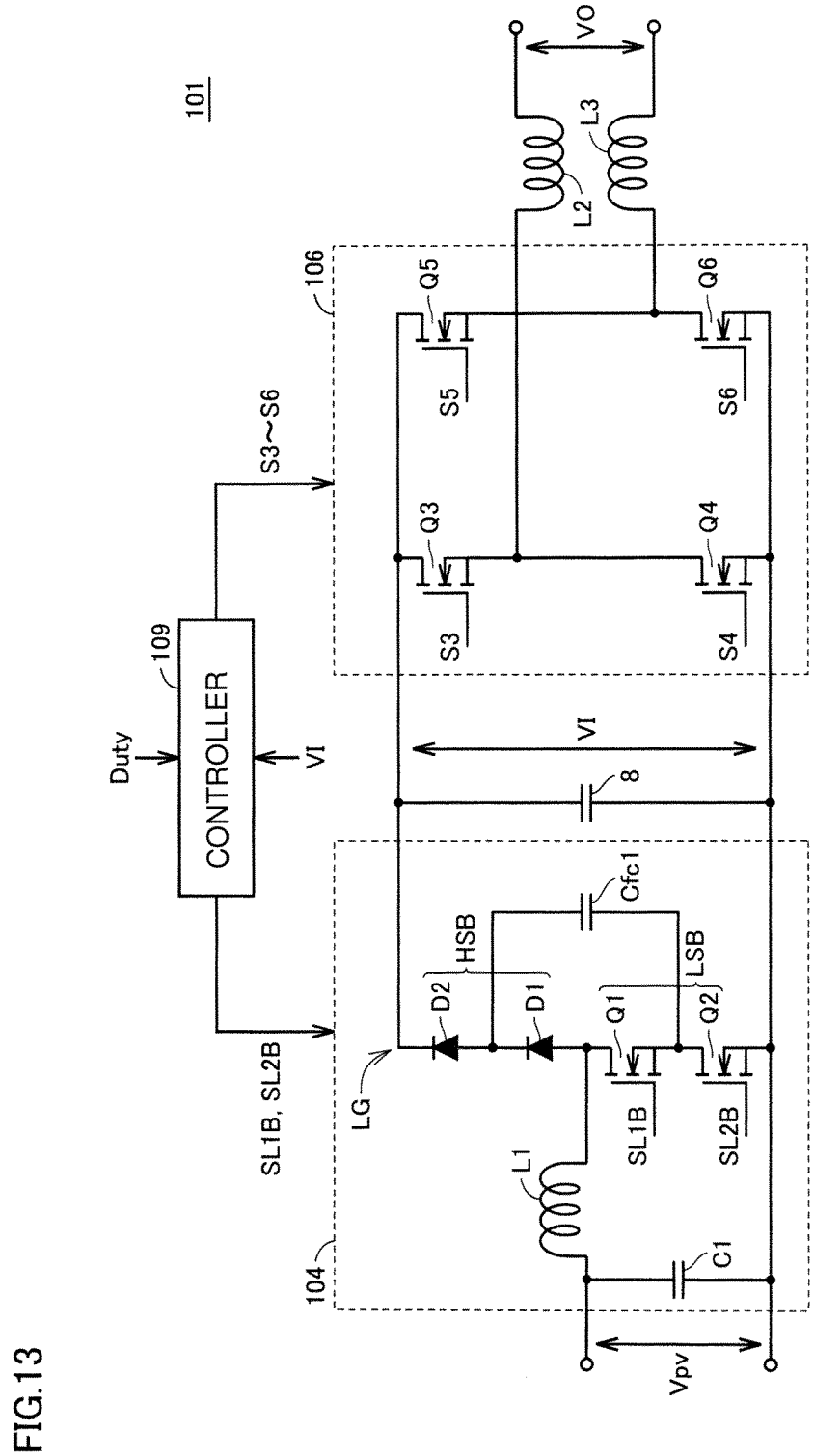
FIG. 13 is a circuit diagram illustrating the configuration of a power converter of a second preferred embodiment of the present invention.

FIG. 13 is a circuit diagram illustrating the configuration of a power converter of the second preferred embodiment.

A DC-DC converter 104 is preferably a step-up chopper circuit including a flying capacitor and the downstream DC-AC inverter 106 is preferably an inverter that generates general single-phase alternating current.

The DC-DC converter 104 receives the direct-current voltage Vpv and outputs the step-up voltage VI. The DC-AC inverter 106 converts the direct-current voltage VI into the alternating-current voltage VO.

The DC-DC converter 104 includes the coil L1, the filter capacitor C1, transistors Q1 and Q2, and diodes D1 and D2. Transistors may be used, instead of the diodes D1 and D2. A semiconductor switching element, such as a MOSFET or an IGB, for example, may preferably be used as each transistor.

The smoothing capacitor 8 is connected between a pair of power lines through which the voltage VI is supplied from the DC-DC converter 104 to the DC-AC inverter 106.

The DC-AC inverter 106 includes semiconductor switching elements Q3 to Q6. The semiconductor switching elements Q3 and Q4 are connected in series between a pair of power lines to which both terminals of the smoothing capacitor 8 are connected, and the semiconductor switching elements Q5 and Q6 are connected in series to the pair of power lines. A connection node between the semiconductor switching elements Q3 and Q4 is connected to one end of the coil L2 and a connection node between the semiconductor switching elements Q5 and Q6 is connected to one end of a coil L3. The alternating-current voltage VO is output from the other end of the coil L2 and the other end of the coil L3.

The DC-DC converter 104 includes a leg LG that receives the voltage VI at both ends and a flying capacitor Cfc1.

The leg LG includes a high-side switch HSB including a series circuit that includes the two diodes D1 and D2 and a low-side switch LSB including a series circuit that includes the two semiconductor switching elements Q1 and Q2. The low-side switch LSB is connected in series to the high-side switch HSB at a connection node to which one end of the coil L1 is connected.

Figure 14:
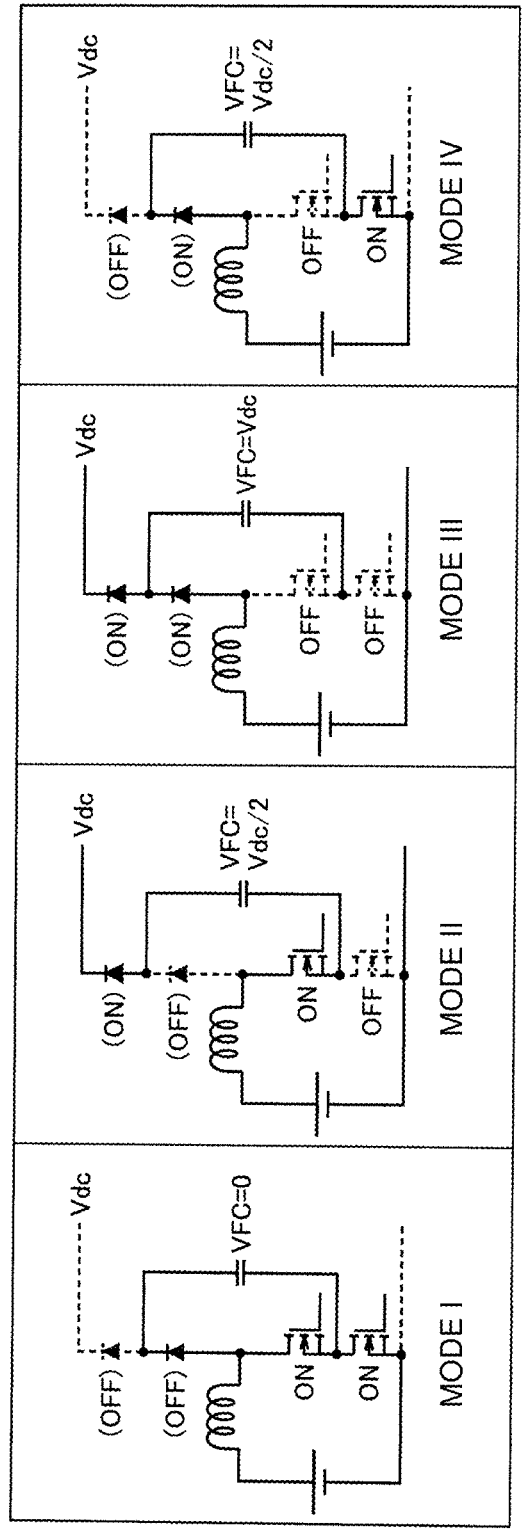
FIG. 14 is a diagram for describing operation modes of a power conversion stage including a flying capacitor in the second preferred embodiment of the present invention.

FIG. 14 is a diagram for describing operation modes of the power conversion stage including the flying capacitor in the second preferred embodiment.

In the mode I in FIG. 14, the diodes D1 and D2 are in the OFF state and the semiconductor switching elements Q1 and Q2 are in the ON state. The voltage Vfc of the flying capacitor is 0 V in the mode I.

In the mode II in FIG. 14, the diodes D1 and D2 are in the OFF state and the ON state, respectively, and the semiconductor switching elements Q1 and Q2 are in the ON state and the OFF state, respectively. The voltage Vfc of the flying capacitor is VI/2 in the mode II.

In the mode III in FIG. 14, the diodes D1 and D2 are in the ON state and the semiconductor switching elements Q1 and Q1 are in the OFF state. The voltage Vfc of the flying capacitor is VI in the mode III.

In the mode IV in FIG. 14, the diodes D1 and D2 are in the ON state and the OFF state, respectively, and the semiconductor switching elements Q1 and Q1 are in the OFF state and the ON state, respectively. The voltage Vfc of the flying capacitor is VI/2 in the mode IV.

Transistors that perform synchronous rectification may be used, instead of the diodes D1 and D2, in the power conversion stage. The diodes may be considered as one kind of the semiconductor switching elements in a point in which the diodes also switch between the on state and the off state of the current depending the direction of the current. Specifically, transistor elements that are controlled in the states indicated by ON and/or OFF in brackets may be used for portions indicated by the brackets in FIG. 14.

Since one flying capacitor Cfc1 is included in the power converter according to the second preferred embodiment, which has the configuration illustrated in FIG. 13, the controller 109 performs control so that ΔVcf1 is equal or approximately equal to zero in the following equation (5):

$$\Delta Vcf1 = \tfrac{1}{2} \cdot Vin2 + V\alpha \cdot \sin(2\omega t) - Vcf1 \qquad (5)$$

Also in the second preferred embodiment, the leg LG may have the configuration (the switching elements of a 2n-number and the flying capacitors of an n−1 number) illustrated in FIG. 12.

Also in the second preferred embodiment, it is possible to reduce the ripples by controlling the high-side switch and the low-side switch so that the target value of the voltage between both ends of the flying capacitor is maximized at a phase angle of about π/4 and is minimized at a phase angle of about π/4 based on at least one of the voltage value, the phase, and the frequency of the alternating-current voltage, as in the first preferred embodiment. Here, the alternating-current voltage is A sin ωt (A denotes amplitude, ω denotes angular frequency, and t denotes time and the phase angle is 0° when t=0).

Although the upstream DC-DC converter is preferably a step-up converter, for example, in the first and the second preferred embodiments, the ripples are capable of being reduced through similar control even if this portion is a step-down converter, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power converter comprising:
a first voltage converter that converts a first direct-current voltage into a second direct-current voltage;
a second voltage converter connected to the first voltage converter and that converts the second direct-current voltage into alternating-current voltage;
a capacitor provided between the first voltage converter and the second voltage converter and that receives the second direct-current voltage between terminals of the capacitor; and
a controller that controls the first voltage converter and the second voltage converter; wherein
when "n" denotes an integer not smaller than two and "m" denotes an integer that is not smaller than one and that is not greater than n−1, at least one of the first voltage converter and the second voltage converter includes:
a first switch circuit in which an n-number of first semiconductor switching elements are connected in series to each other;
a second switch circuit in which an n-number of second semiconductor switching elements are connected in series to each other; and
an n−1 number of flying capacitors;
the first switch circuit and the second switch circuit are connected at a connection node;
among the n−1 flying capacitors, an m-th flying capacitor is connected between a first intermediate node and a second intermediate node, the first intermediate node being a node that connects an m-th first semiconductor switching element to an m+1-th first semiconductor switching element at a side of the first switch circuit viewed from the connection node, the second intermediate node being a node that connects an m-th second semiconductor switching element to an m+1-th second semiconductor switching element at a side of the second switch circuit viewed from the connection node; and
the controller controls the first switch circuit and the second switch circuit so that a target value of voltage between both ends of the flying capacitor is maximized at a phase angle of about π/4 and is minimized at a phase angle of about 3π/4 based on the alternating-current voltage "VO", which is A sin ωt, where "A" denotes amplitude, "ω" denotes angular frequency, and "t" denotes time and a phase angle is 0° when t=0.

2. The power converter according to claim 1, wherein the controller controls the first switch circuit and the second switch circuit based on at least one of a voltage value, a phase, and a frequency of the alternating-current voltage.

3. The power converter according to claim 1, wherein
the controller determines basic conduction times of the n first semiconductor switching elements and the n second semiconductor switching elements based on a control signal having a basic pulse width; and
when correction to reduce a conduction time of either of the first semiconductor switching elements and the second semiconductor switching elements is performed based on a variation in the alternating-current voltage, the controller increases the conduction time of the remaining of the first semiconductor switching elements and the second semiconductor switching elements.

4. The power converter according to claim 1, wherein the first voltage converter is a step-up converter.

5. The power converter according to claim 1, wherein
each of the first semiconductor switching elements is a metal oxide semiconductor field effect transistor or a diode; and
each of the second semiconductor switching elements is a metal oxide semiconductor field effect transistor.

6. The power converter according to claim 1, wherein a terminal at an input side of the first voltage converter receives direct-current power provided by a solar panel.

7. The power converter according to claim 1, wherein
each of the first semiconductor switching elements is an insulated gate bipolar transistor; and
each of the second semiconductor switching elements is an insulated gate bipolar transistor.

8. The power converter according to claim 1, wherein the n-number is three.

9. A system comprising:
a solar panel; and
the power converter according to claim 1;
wherein
the capacitor provided between the first voltage converter and the second voltage converter is a smoothing capacitor;
the first voltage converter is disposed on an upstream side of the system;
the second voltage converter is a DC-AC inverter; and the DC-AC inverter is disposed on a downstream side of the system.

10. The system according to claim 9, wherein the smoothing capacitor is connected between the first voltage converter and the DC-AC inverter to remove ripples.

11. The system according to claim 9, wherein the first voltage converter is a photovoltaic converter.

12. The system according to claim 9, wherein the controller controls the first switch circuit and the second switch circuit based on at least one of a voltage value, a phase, and a frequency of the alternating-current voltage.

13. The system according to claim 9, wherein
the controller determines basic conduction times of the n first semiconductor switching elements and the n second semiconductor switching elements based on a control signal having a basic pulse width; and
when correction to reduce a conduction time of either of the first semiconductor switching elements and the second semiconductor switching elements is performed based on a variation in the alternating-current voltage, the controller increases the conduction time of the remaining of the first semiconductor switching elements and the second semiconductor switching elements.

14. The system according to claim 9, wherein the first voltage converter is a step-up converter.

15. The system according to claim 9, wherein
each of the first semiconductor switching elements is a metal oxide semiconductor field effect transistor or a diode; and
each of the second semiconductor switching elements is a metal oxide semiconductor field effect transistor.

16. The system according to claim 9, wherein a terminal at an input side of the first voltage converter receives direct-current power sent from the solar panel.

17. The system according to claim 9, wherein
each of the first semiconductor switching elements is an insulated gate bipolar transistor; and
each of the second semiconductor switching elements is an insulated gate bipolar transistor.

18. The system according to claim 9, wherein the n-number is three.

* * * * *